(12) United States Patent
Chen et al.

(10) Patent No.: US 7,315,417 B2
(45) Date of Patent: Jan. 1, 2008

(54) SCREEN FRAME AND BEZEL CLIP SYSTEM

(75) Inventors: Luan Chi Chen, Garden Grove, CA (US); James E. Hicks, Laguna Beach, CA (US); Jeffrey G. Whitelaw, Corona, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 288 days.

(21) Appl. No.: 11/097,399

(22) Filed: Mar. 31, 2005

(65) Prior Publication Data

US 2006/0221265 A1   Oct. 5, 2006

(51) Int. Cl.
*G03B 21/56* (2006.01)
*G02B 5/04* (2006.01)

(52) U.S. Cl. ............... 359/450; 359/449; 359/460; 359/839; 348/904

(58) Field of Classification Search ............ 359/450, 359/443, 449, 460, 836; 348/904
See application file for complete search history.

(56) References Cited

U.S. PATENT DOCUMENTS 6,459,531 B1 * 10/2002 Min .................. 359/450
6,532,152 B1 * 3/2003 White et al. ......... 361/692
7,002,640 B2 * 2/2006 Jung ................... 348/787

* cited by examiner

*Primary Examiner*—Diane Lee
*Assistant Examiner*—Magda Cruz
(74) *Attorney, Agent, or Firm*—Orrick, Herrington & Sutcliffe LLP

(57) ABSTRACT

An apparatus and methods that facilitate efficient and easy installation of a display screen and protective shield onto a cabinet of a display unit such as a projection TV (PTV) and the like. Preferably, a screen frame and bezel clip system includes a bezel clip having a latch arm releaseably coupleable to catch arm extending from or attached to a cabinet side wall of a display unit. The bezel clip further includes one or more receptacles sized and shaped to receive and retain a side or edge portion of one or more screens. The catch arm is preferably deformable under pressure and returns to a pre-stressed orientation when the pressure is removed. Alternatively, a screen frame and bezel mount system includes a stiffener member adapted to couple a bezel member to a cabinet side wall of a display unit. The bezel member includes one or more receptacles sized and shaped to receive and retain a side or edge portion of one or more screens.

5 Claims, 8 Drawing Sheets

SCREEN FRAME AND BEZEL CLIP SYSTEM

FIELD OF THE INVENTION

The invention relates generally to projection television systems and more particularly to a screen frame and bezel clip system that facilitates easy installation of a projection television screen and shield.

BACKGROUND INFORMATION

Projection and other large screen televisions (PTVs), including monochrome cathode ray tube (CRT), liquid crystal on silicon (LCOS), digital light processing (DLP) and liquid crystal display (LCD) technology based PTVS, are a popular alternative to shadow mask CRT television sets, as they provide relatively large viewable screens that cannot be efficiently produced using conventional shadow mask CRTs. PTVs typically include an enclosure housing an optical unit and electronic components for receiving and projecting an image onto a screen assembly mounted on the front of the enclosure.

The screen of the PTV is typically a high-quality optical system that is carefully designed to deliver sharp, bright images with even illumination. PTV manufacturers often affix protective shields or screens formed from a hard clear or tinted plastic, acrylic or the like to the PTV to protect the projection screen from physical damage. Due to the generally large size of the screens and shields, and the mechanical means by which the screens and shields are typically attached to the PTV, installing such screens and shields in the factory and/or removing and re-installing the shields in the field at a customer's home tends to be quite difficult and cumbersome.

Accordingly, it would be desirable to provide a means that facilitates easy installation such screens and shields, and removal of a such shields.

SUMMARY

An apparatus and methods are provided that facilitate efficient and easy installation of a display screen and protective shield onto a cabinet of a display unit such as a projection TV (PTV) and the like. In one embodiment, which is described below as an example only and not to limit the invention, a screen frame and bezel clip system includes a bezel clip having a latch arm releaseably coupleable to catch arm extending from or attached to a cabinet side wall of a display unit. The bezel clip is preferably formed of plastic and further includes one or more receptacles sized and shaped to receive and retain a side or edge portion of one or more screens. The catch arm is preferably formed of plastic and is deformable under pressure and returns to a pre-stressed orientation when the pressure is removed. Alternatively, the latch arm of the bezel clip is deformable under pressure and returns to a pre-stressed orientation when the pressure is removed.

In another embodiment, which is described below as an example only and not to limit the invention, a screen frame and bezel mount system includes a stiffener member adapted to couple a bezel member to a cabinet side wall of a display unit. The bezel member includes one or more receptacles sized and shaped to receive and retain a side or edge portion of one or more screens.

Other features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

Referring in detail to the figures, the apparatus and methods described herein allow for the efficient and easy installation of a display screen and protective shield onto a cabinet of a display unit such as a projection TV (PTV) and the like. Turning to FIGS. 1A, 1B, 2A and 2B, a first embodiment of a screen frame and bezel clip system 10 is shown. The clip system 10 includes a catch arm 20 having a body 22 extending outwardly from a cabinet sidewall 11 of a PTV 12. Preferably, the catch arm 20 and cabinet sidewall 11 are formed as a unitary piece of molded plastic.

Figure 1A:
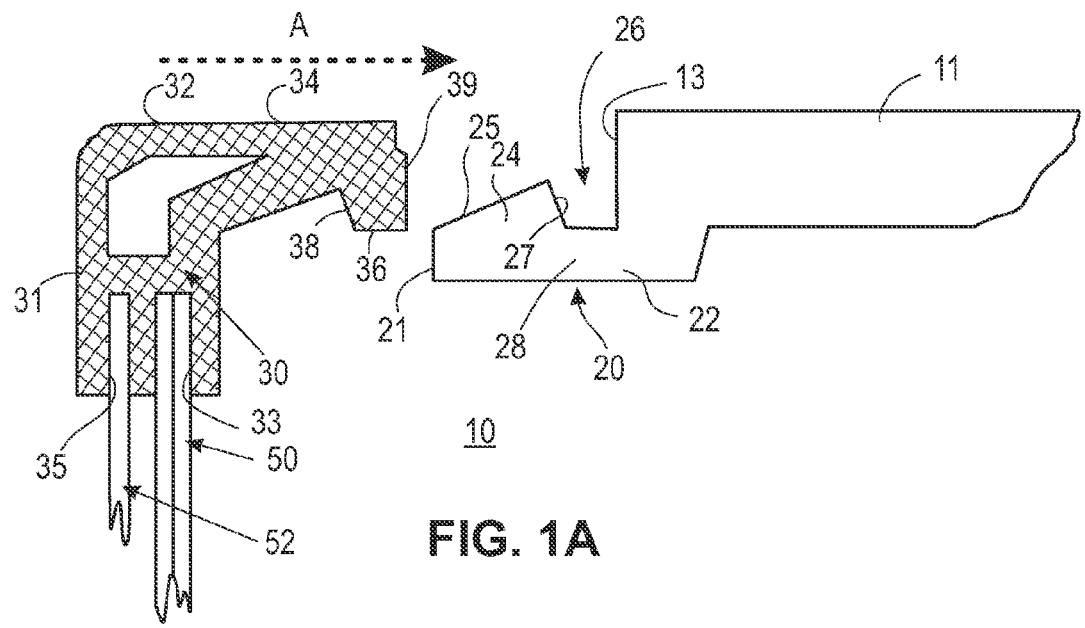
FIG. 1A is a partial top sectional view of a first embodiment of a screen frame and bezel clip system prior to assembly to a PTV cabinet.

Toward a forward edge 21 of the elongate body 22, the catch arm 20 includes an integrally formed abutment or catch guide 24 extending outwardly, i.e., upwardly in the plane of the page of FIG. 1A, from the body 22. The catch guide has an upper surface 25 that is sloped or inclined such that the thickness of the catch guide 24 and the height of the sloped surface 25 increases as the distance from the forward edge 21 increases. The catch guide 24 is positioned along the body 22 of the catch arm 20 in spaced relation with the forward edge 13 of the cabinet sidewall 11 with a locking recess or catch 26 formed there between. The catch arm 20 is thinnest in a region 28 below the recess 26 advantageously providing a pliable, spring like quality to the catch arm 20 such that the catch arm 20 is bendable enabling the forward end or catch guide 24 region of the catch arm 20 to move inwardly, i.e., downwardly in the plane of the page of FIG. 1A, when pressure is applied to the guide surface 25.

The clip system 10 also includes a screen frame and bezel clip 30. The clip 30 includes a generally L-shaped body 32 preferably formed from molded plastic. The longer leg of the L-shaped body 32 extends toward the cabinet sidewall 11 to form a latch arm 34 with a protuberance or latch member 36 extending inwardly, i.e., downwardly in the plane of the page of FIG. 1A, from the end 39 of the latch arm 34 adjacent the cabinet side wall 11. The shorter leg of the L-shaped body 32 extends generally orthogonally from the latch arm 34 to form a screen frame 31 with a first recess or socket 33 sized and shaped to interferingly receive and retain a side or edge portion of a first screen 50, preferably comprising a display screen or lenticular lens and fresnel lens assembly, and a second recess or socket 35 sized and shaped to interferingly receive and retain a side or edge portion of a second screen 52 that is preferably a protective shield.

Figure 1B:
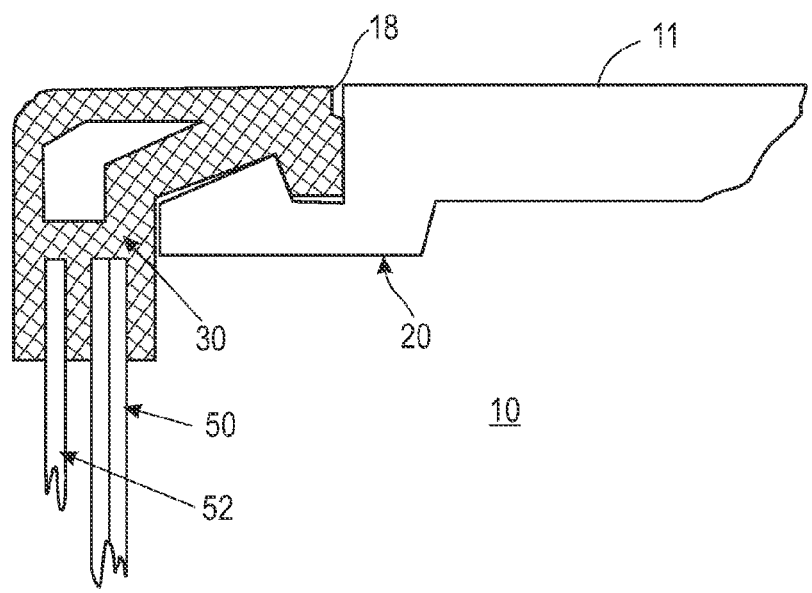
FIG. 1B is a partial top sectional view of the first embodiment of the screen frame and bezel clip system shown in FIG. 1A after assembly to the PTV cabinet.
Figure 2B:
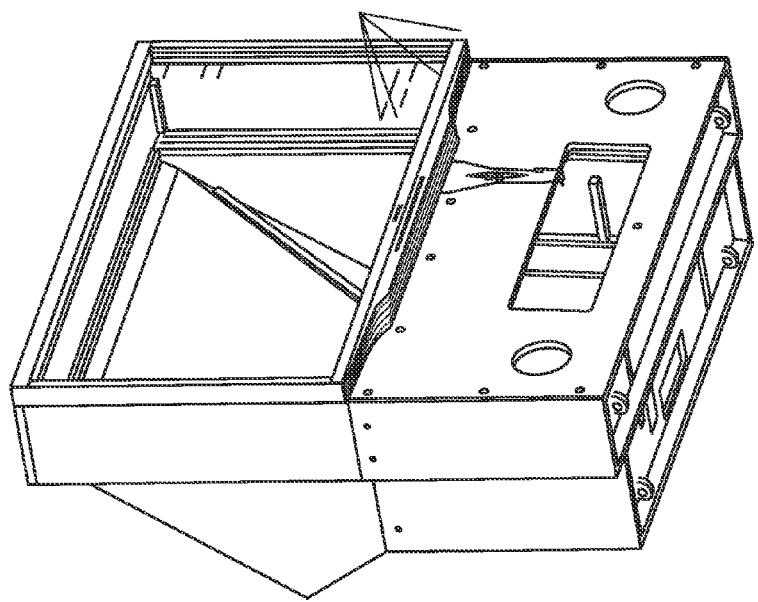
FIG. 2B is a perspective view of a PTV with the screen and shield assembly mounted on to the PTV cabinet using a screen frame and bezel clip system.
Figure 2A:
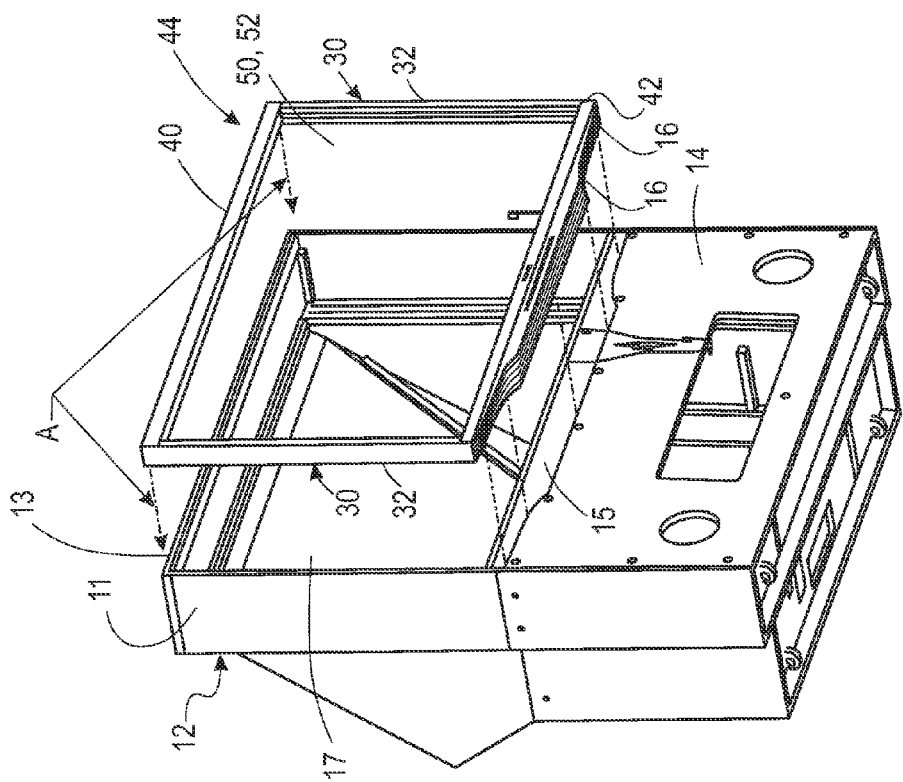
FIG. 2A is a perspective view of a PTV prior to installation of a screen and shield assembly to the PTV cabinet using a screen frame and bezel clip system.

As depicted in FIG. 2A, a screen frame and bezel clip 30 is mounted on each side of the display screen assembly 50 and protective shield 52 with the clip's elongate body 32 preferably extending substantially the full length of the sides of the display screen assembly 50 and protective shield 52. Elongate top and bottom screen frame and bezels 40 and 42 are preferably mounted on and preferably extend substantially along the full width of the top and bottom of the display screen assembly 50 and protective shield 52. Alternatively, the top screen frame and bezel 40 could also be a screen frame and bezel clip 30 as depicted in FIGS. 1A and 1B. As further depicted in FIGS. 2A and 2B, the assembly 44, comprising the screen and lens 50, protective shield 52, right and left screen frame and bezel clips 30, and top and bottom screen frame and bezels 40 and 42, is preferably mounted on the PTV cabinet 12 by directing the assembly 44 in a direction toward the cabinet 12 defined by arrows A along a horizontal plane generally orthogonal to the cabinet sidewalls 11 and face 14 of the cabinet 12 until the latch arms 34 and catch arms 20 of the screen frame and bezel clip system 10 lockingly engage one another, which is shown in detail in FIG. 1B. Like the clip body 32, the elongate body 22 of the catch arms 20 preferably extends substantially the full length of the cabinet side walls 11, or, in the alternative, along the top panel 13 and bottom panel 15 of the screen opening 17, or along all four or any three of the top 13, bottom 15 and side 11 panels, or as "teeth" along these panels at intermittent location. Once the clip system 10 is engaged, a plurality of fasteners 16, such as screws and the like, are used to secure the bottom screen frame and bezel 42 to the face 14 of the PTV cabinet 12.

Turning back to FIGS. 1A and 1B, as the screen frame and bezel clip 30 travels in a direction according to arrow A, the latch member 36 of the latch arm 34 engages the guide surface 25 of the catch guide 24 of the catch arm 20. As the latch member 36 progresses along the guide surface 25, it pushes down on the guide surface 25 causing the catch arm 20 to bend or deform about the region 28 below the recess 26 enabling the catch guide 24 to be displaced inwardly away from the latch member 36. Once the latch member 36 progresses beyond the guide surface 25, the catch arm 20 springs back generally to its original position or non-stressed orientation and lockingly receives the latch member 36 in the recess 26 with a latching surface 38 of the latch member 36 abutting a locking surface 27 of the recess 26. Alternatively, the latch arm 34 of the bezel clip is deformable under pressure and as the latch member 36 progresses along the guide surface 25, the latch arm 34 is caused to bend or deform outwardly. The latch arm 34 returns to a pre-stressed orientation once the latch member 36 progresses beyond the guide surface 25.

As depicted, the locking surface 27 preferably ramps or slopes upwardly and outwardly away from the forward edge 13 of the cabinet side wall 11 and the surface of the forward end 39 of the latch arm 34 is stepped such that a gap or recess 18 is formed between the cabinet side wall 11 and the latch arm 34 when the latch arm 34 is coupled with the catch arm 20. Alternatively, the cabinet side wall 11 could be stepped in a like manner to form the same or similar gap 18. A tool (not shown) can be inserted in the gap 18 and used to pry or release the latch arm 34 from the catch arm 20. In doing so, the latch member 36 presses against and progresses along the locking surface 27 of the recess 26 and, thus, causes the catch arm 20 to deform or bend in a direction away from the latch arm 34 until the latch member 36 moves beyond the locking surface 27 and exits the recess 26. Alternatively, the sidewall 11 could be pressed inward (downward in the plane of the page) at a point adjacent the forward edge 13 as the clip 30 is pulled outwardly (leftwardly in the plane of the page) to release the latch arm 34 from the catch arm 20. Once the latch member 36 is released from the recess 26 and the latch arm 34 and catch arm 20 are no longer releasably coupled, the catch arm 20 springs back generally to its pre-stressed or original orientation.

Figure 3A:
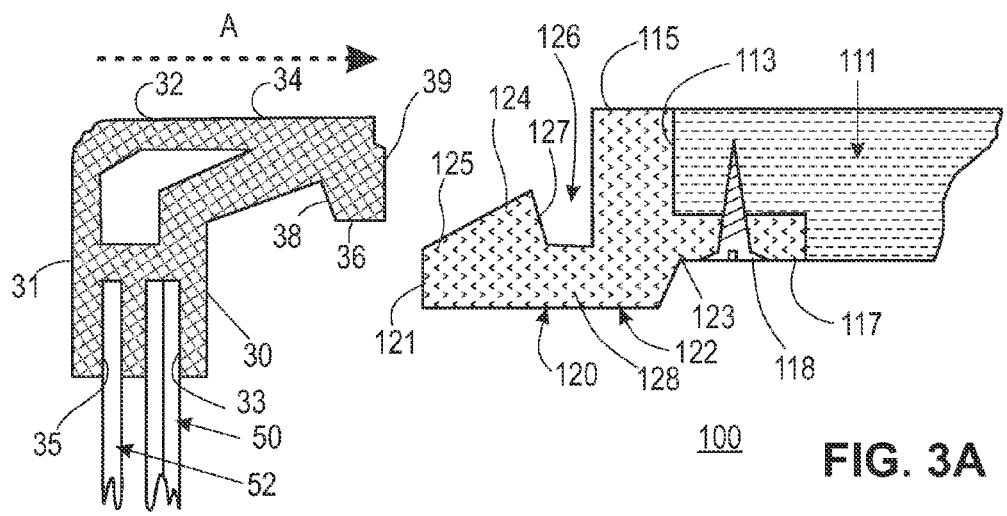
FIG. 3A is a partial top sectional view of a second embodiment of a screen frame and bezel clip system prior to assembly to a PTV cabinet.
Figure 3B:
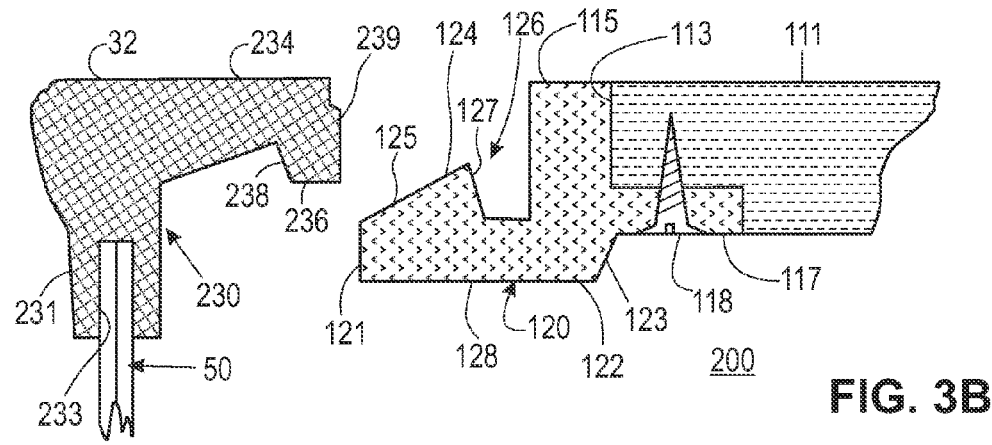
FIG. 3B is a partial top sectional view of a third embodiment of a screen frame and bezel clip system prior to assembly to a PTV cabinet.
Figure 3C:
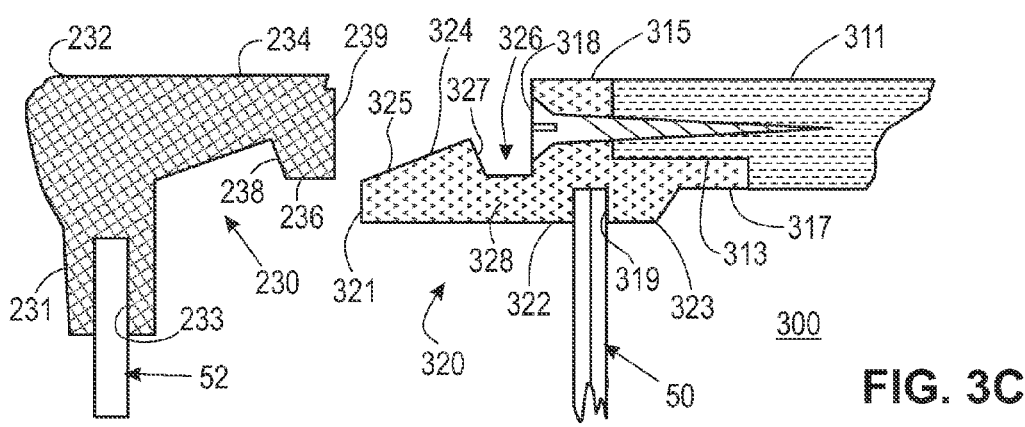
FIG. 3C is a partial top sectional view of a fourth embodiment of a screen frame and bezel clip system prior to assembly to a PTV cabinet.

Turning to FIGS. 3A, 3B and 3C, three alternative embodiments of the screen frame and bezel clip system are depicted. In FIG. 3A, the screen frame and bezel clip system 100 is shown to include the same screen frame and bezel clip 30 as depicted in FIGS. 1A and 1B, and a catch arm 120 formed of molded plastic and attachable to a cabinet sidewall 111 of a PTV. The sidewall 111 can be formed out of wood, particle board, molded or extruded plastic, expanded polystyrene foam, and the like, and to include a stepped edge 113. The catch arm 120 similarly includes an elongate body 122. At an end 123 of the body 122 adjacent the cabinet side wall 111, the catch arm 120 includes a first mounting tab 115 extending from the body 122 orthogonally to the cabinet side wall 111 and a second mounting tab 117 extending from the body 122 orthogonally to the first mounting tab 115. The first and second mounting tab 115 and 117 are sized and shaped to conform to the stepped edge 113 of the cabinet sidewall 111 and affix the catch arm 120 to the cabinet sidewall 111 preferably using fasteners 118 such as screws and the like.

As with the catch arm 120 depicted in FIGS. 1A and 1B, the catch arm 120 of this embodiment includes an integrally formed catch guide 124 extending from the body 122 in a region toward a forward edge 121 of the elongate body 122. The catch guide 124 has an upper surface 125 that is sloped or ramped such that the thickness of the catch guide 124 and the height of the sloped surface 125 increases as the distance from the forward edge 121 increases. The catch guide 124 is positioned along the catch arm 120 in spaced relation with the first mounting tab 115 forming a recess or catch 126 there between. The catch arm 120 is thinnest in a region 128 below the recess 126 providing a spring like quality to the catch arm 120 such that the catch arm 120 is bendable or deformable enabling the forward end or catch guide 124 region of the catch arm 120 to be displaced when pressure is applied to the guide surface 125, which occurs as the screen frame and bezel clip 30 travels in a direction according to arrow A, and the latch member 36 of the latch arm 34 engages the guide surface 125 of the catch arm 120. As the latch member 36 progresses along the guide surface 125, it will push down on the guide surface 125 causing the catch arm 120 to bend or deform about the region 128 below the recess 126 enabling the catch guide 124 to be displaced in a direction away from the latch member 36. Once the latch member 36 progresses beyond the guide surface 125, the catch arm 120 springs back generally to its original position or non-stressed orientation and lockingly receives the latch member 36 in the recess 126 with a latching surface 38 of the latch member 36 abutting a locking surface 127 of the recess 126.

As depicted, the locking surface 127 preferably ramps or slopes upwardly and outwardly away from the first mounting tab 115 and the surface of the forward end 39 of the latch arm 34 is stepped such that a gap would form between the first tab 115 and the latch arm 34 when the latch arm 34 is coupled with the catch arm 120. Alternatively, the first mounting tab 115 could include a stepped surface in a like manner to form the same or similar gap. A tool (not shown) can be inserted in the gap and used to pry or release the latch arm 34 from the catch arm 120. In doing so, the latch member 36 presses against and progresses along the locking surface 127 of the recess 126 and, thus, causes the catch arm 120 to deform or bend until the latch member 36 moves beyond the locking surface 127 and exits the recess 126. Alternatively, the sidewall 111 could be pressed inward (downward in the plane of the page) at a point adjacent the forward edge 113 as the clip 30 is pulled outwardly (leftwardly in the plane of the page) to release the latch arm 34 from the catch arm 120. Once the latch member 36 is released from the recess 126 and the latch arm 34 and catch arm 120 are no longer releasably coupled, the catch arm 120 springs back generally to its pre-stressed or original orientation.

In FIG. 3B, the screen frame and bezel clip system 200 is shown to include the same catch arm 120 and cabinet side wall 111 as depicted in FIG. 3A, and a screen frame and bezel clip 230 with a generally L-shaped body 232 preferably formed from molded plastic. The longer leg of the L-shaped body 232 extends toward the cabinet sidewall 111 to form a latch arm 234 with a protuberance or latch member 236 extending from the end 239 of the latch arm 234 adjacent the cabinet side wall 111. The shorter leg of the L-shaped body 232 extends generally orthogonally from the latch arm 234 to form a screen frame 231 with a recess or socket 233 sized and shaped to interferingly receive and retain a side or edge portion of a display screen assembly 50.

The surface of the forward end 239 of the latch arm 234 is stepped such that a gap would form between the first tab 115 and the latch arm 234 when the latch arm 234 is coupled with the catch arm 120. Alternatively, the first mounting tab 115 could include a stepped surface in a like manner to form the same or similar gap. Coupling and uncoupling of the latch arm 234 and catch arm 120 of the screen frame and bezel clip system 200 occurs is the same manner as the latch arm 30 and catch arm 120 of the screen frame and bezel clip system 100 shown in FIG. 3A.

In FIG. 3C, the screen frame and bezel clip system 300 is shown to include the same screen frame and bezel clip 230 as depicted in FIG. 3B except that the shorter leg of the L-shaped body 232, which extends generally orthogonally from the latch arm 234, forms a screen frame 231 with a recess or socket 233 sized and shaped to interferingly receive and retain a side or edge portion of a protective shield 52.

The clip system 300 further includes a catch arm 320 formed of molded plastic and attachable to a cabinet sidewall 311 of a PTV. The sidewall 311 can be formed out of wood, particle board, molded or extruded plastic, expanded polystyrene foam, and the like, and to include a stepped edge 313. The catch arm 320 similarly includes an elongate body 322. At an end 323 of the body 322 adjacent the cabinet side wall 311, the catch arm includes a first mounting tab 315 extending from the body 322 orthogonally to the cabinet side wall 311 and a second mounting tab 317 extending from the body 322 orthogonally to the first mounting tab 315. The first and second mounting tab 315 and 317 are sized and shaped to conform to the stepped edge 313 of the cabinet sidewall 311 and affix the catch arm 320 to the cabinet sidewall 311 preferably using fasteners 318 such as screws and the like.

A recess or socket 319 is formed in the end 323 of the body 322 adjacent to the first and second mounting tabs 315 and 317. The recess is sized and shaped to interferingly receive and retain a side or edge portion of a display screen assembly 50. Prior to fastening the catch arm 320 to the cabinet side wall 311, a catch arm 320 is fitted onto each side of the display screen assembly 50 (see, e.g., FIG. 2A, clips 30).

As with the catch arm 120 depicted in FIG. 3A, the catch arm 320 of this embodiment includes an integrally formed catch guide 324 extending from the body 322 in a region toward a forward edge 321 of the elongate body 322. The catch guide 324 has an upper surface 325 that is sloped or ramped such that the thickness of the catch guide 324 and the height of the sloped surface 325 increases as the distance from the forward edge 321 increases. The catch guide 324 is positioned along the catch arm 320 in spaced relation with the first mounting tab 315 forming a recess or catch 326 there between. The catch arm 320 is thinnest in a region 328 below the recess 326 providing a spring like quality to the catch arm 320 such that the catch arm 320 is bendable enabling the forward end or catch guide 324 region of the catch arm 320 to be displaced when pressure is applied to the guide surface 325, which occurs as the screen frame and bezel clip 230 travels in a direction according to arrow A, and the latch member 236 of the latch arm 234 engages the guide surface 325 of the catch arm 320. As the latch member 236 progresses along the guide surface 325, it will push down on the guide surface 325 causing the catch arm 320 to bend or deform about the region 328 below the recess 326 enabling the catch guide 324 to be displaced in a direction away from the latch member 236. Once the latch member 236 progresses beyond the guide surface 325, the catch arm 320 springs back generally to its original position or non-stressed orientation and lockingly receives the latch member 236 in the recess 326 with a latching surface 238 of the latch member 236 abutting a locking surface 327 of the recess 326.

Figure 4A:
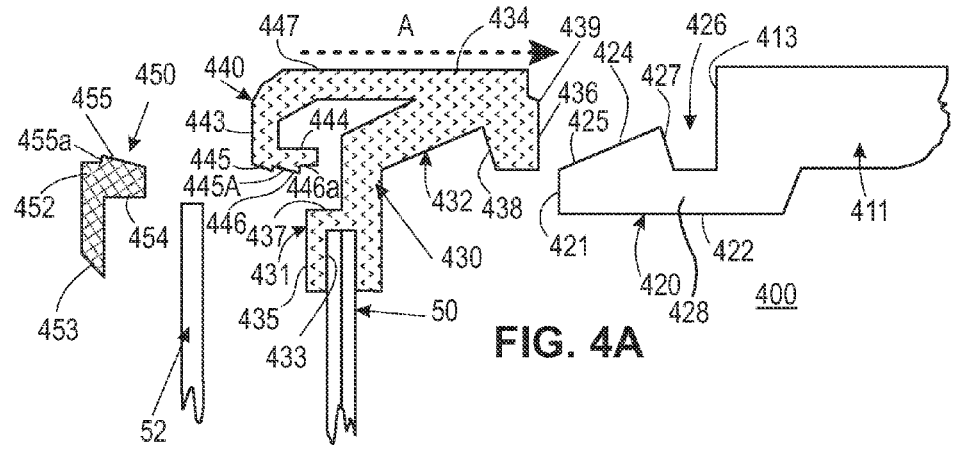
FIG. 4A is a partial top sectional view of a fifth embodiment of a screen frame and bezel clip system prior to assembly to a PTV cabinet.
Figure 4B:
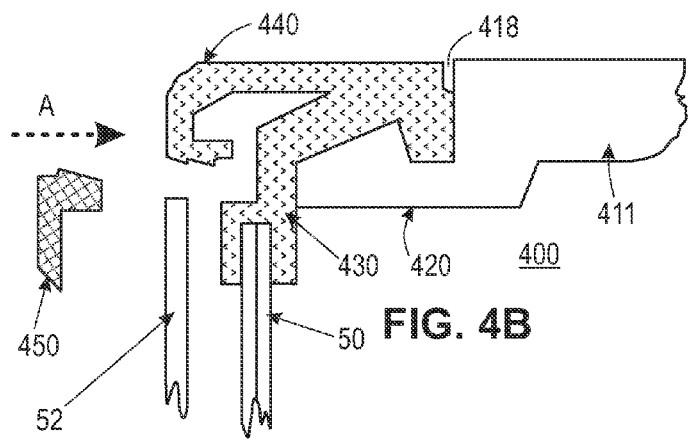
FIG. 4B is a partial top sectional view of the fifth embodiment of the screen frame and bezel clip system shown in FIG. 4A after partial assembly to the PTV cabinet.
Figure 4C:
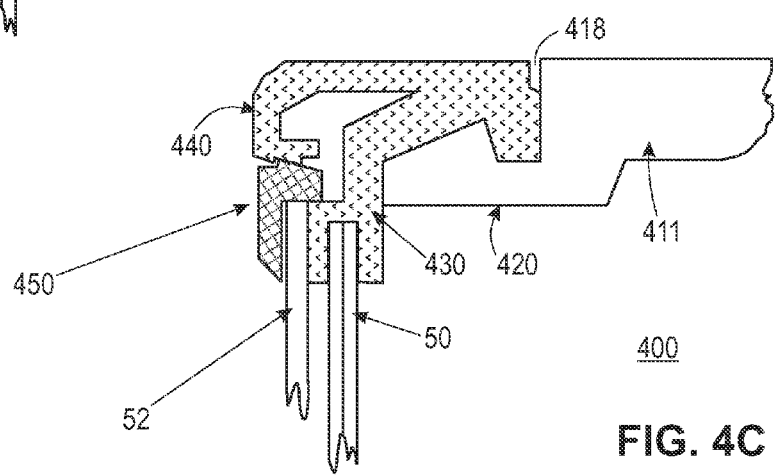
FIG. 4C is a partial top sectional view of the fifth embodiment of the screen frame and bezel clip system shown in FIGS. 4A and 4B after full assembly to the PTV cabinet.

Referring to FIGS. 4A, 4B and 4C, another embodiment of a screen frame and bezel clip system 400 is shown. The clip system 400 is shown to include the same catch arm 420 with an elongate body 422 extending from the cabinet sidewall 411, as depicted in FIG. 1A, and a screen frame and bezel clip 430 preferably formed from molded plastic. The clip 430 is shown to include a generally horizontally disposed (in the plane of the page of FIG. 4A) latch arm 434 with a latch member 436 extending inwardly or downwardly (in the plane of the page of FIG. 4A) from the end 439 of the latch arm 434 adjacent the cabinet side wall 411. A midsection 432 of the clip 430 slopes downwardly to a screen frame member 431, which extends generally orthogonally away from the latch arm 434. The frame member 431 includes a recess or socket 433 sized and shaped to interferingly receive and retain a side or edge portion of a first screen 50 preferably comprising a display screen or lenticular lens and fresnel lens assembly. A step 437 is preferably formed in the frame member 431 above the socket 433.

The clip 430 further includes a J-shaped hook member 440 having an elongate leg 442 extending laterally in a direction away from the latch arm 434 and cabinet side wall 411, a base or transition region 443 extending generally orthogonally from the elongate leg 442 and a return leg 444 extending generally orthogonally from the base 443 and laterally in a direction toward the frame member 431 in spaced relation with the step 437. The return leg 444 preferably includes first and second sloped steps 445 and 446 on the side of the return leg 444 that faces the step 437 of the frame member 431. The return leg steps 445 and 446 increase in height as the distance to the end of the return leg 444 decreases.

The clip 430 further includes a retainer 450 to retain a second screen 52, such as a protective shield, against a side 435 of the frame member 431 below the step 437. The retainer 450 includes an L-shaped body 452 wherein the long leg member of the L-shaped body forms a retaining arm 453 that extends over a side or edge portion of the protective shield 52 and the short leg member of the L-shaped body forms a latch arm 454 that extends orthogonally to the retaining arm 453 and across the edge of the screen 52. The latch arm 454 includes a sloped step 455 that increases in height as the distance away from the end of the latch arm 454 increases.

To install, the screen frame and bezel clip 430 travels in a direction according to arrow A as the latch member 436 of the latch arm 434 engages the guide surface 425 of the of the catch arm 420. As the latch member 436 progresses along the guide surface 425, it pushes down on the guide surface 425 causing the catch arm 420 to bend or deform about the region 428 below the recess 426 enabling the catch guide 424 to be displaced inwardly away from the latch member 436. Once the latch member 436 progresses beyond the guide surface 425, the catch arm 420 springs back generally to its original position or non-stressed orientation and lockingly receives the latch member 436 in the recess 426 with a latching surface 438 of the latch member 436 abutting a locking surface 427 of the recess 426.

As depicted, the locking surface 427 preferably ramps or slopes upwardly and outwardly away from the forward edge 413 of the cabinet side wall 411 and the surface of the forward end 439 of the latch arm 434 is stepped such that a gap or recess 418 (FIG. 4B) is formed between the cabinet side wall 411 and the latch arm 434 when the latch arm 434 is coupled with the catch arm 420. A tool (not shown) can be inserted in the gap 418 and used to pry or release the latch arm 434 from the catch arm 420. In doing so, the latch member 436 presses against and progresses along the locking surface 427 of the recess 426 and, thus, causes the catch arm 420 to deform or bend until the latch member 436 moves beyond the locking surface 427 and exits the recess 426. Once the latch member 436 is released from the recess 426 and the latch arm 434 and catch arm 420 are no longer releasably coupled, the catch arm 420 springs back generally to its pre-stressed or original orientation.

As depicted in FIGS. 4B and 4C, the protective shield 52 is mounted against the side 435 of the frame member 431 by directing the retainer 450 in the direction of arrow A. As sloped surface of the step 455 of the latch arm 454 engages the sloped surface of the first step 445 of the return leg 444 of the hook 440, the hook 440 deforms upwardly until the latch arm step 455 passes beyond the first step 445 of the hook 440. The hook 444 then returns to a pre-stressed or original orientation with the rise 455a of the latch arm step 455 abutting the rise 445a of the first step 445 of the return leg 444 locking the protective shield 52 in place against the side 435 of the frame member 431.

Figure 5A:
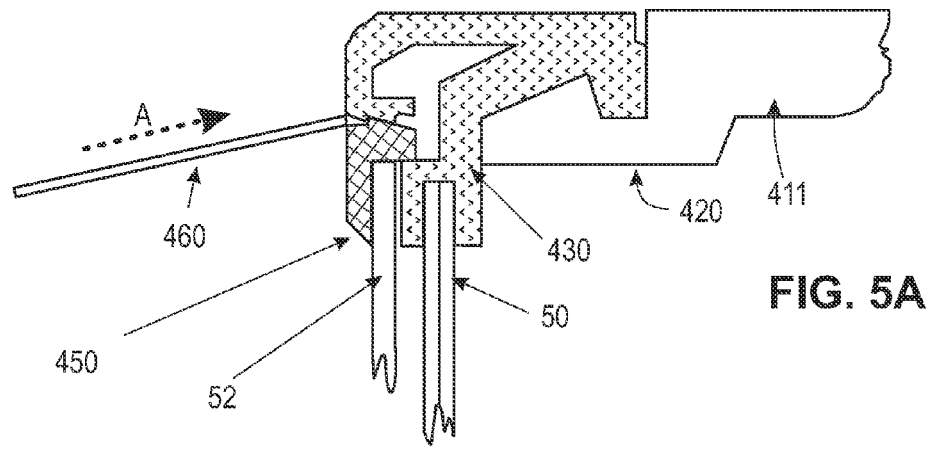
FIGS. 5A, 5B and 5C is a partial top sectional view showing the steps of removing the shield from the fifth embodiment of the screen frame and bezel clip system shown in FIGS. 3A, 3B and 3C.
Figure 5B:
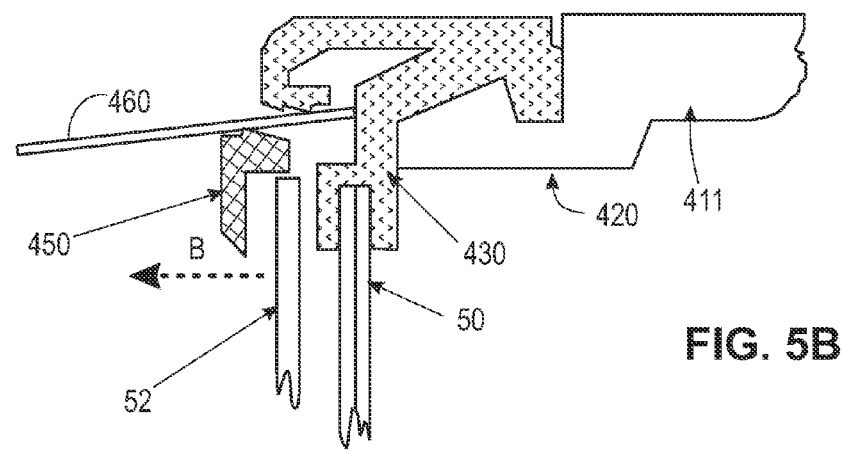
Figure 5C:
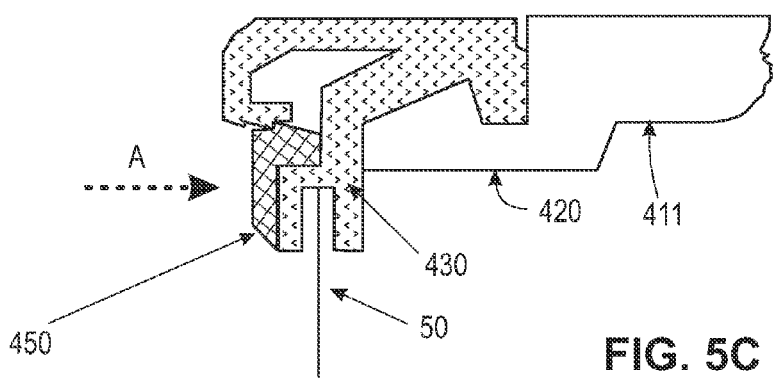

Turning to FIGS. 5A, 5B and 5C, the steps to remove the protective shield 52 and store the retainer 450 are depicted. As shown, a thin tool 460, e.g., a credit card or the like, can be inserted between the retainer 450 and the hook 440 of the clip 430 to upwardly deform the hook 440 and uncouple the retainer 450 and return leg 444 to release the protective shield 52. Once the shield 52 is removed, the retainer 450 can be stored and, thus, advantageously cosmetically covers or hides the gap between the hook 440 and the frame member 431 by inserting the retainer 450 until the latch arm step 455 passes beyond the second step 446 of the return leg 446 and the rise 455a of the latch arm step 455 engages the rise 446a of the second return leg step 446 to lock the retainer in position against the step 437 and side 435 of the frame member 431.

Figure 6A:
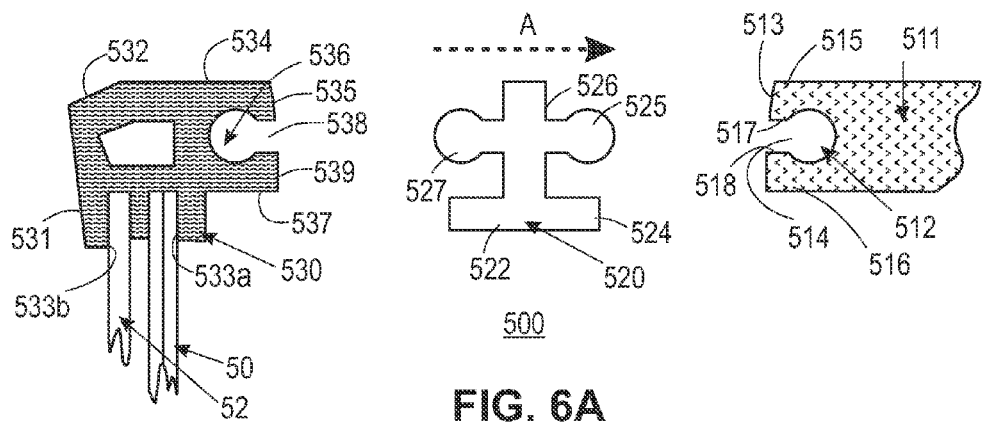
FIG. 6A is a partial top sectional view of a sixth embodiment of a screen frame and bezel clip system prior to assembly to a PTV cabinet.
Figure 6B:
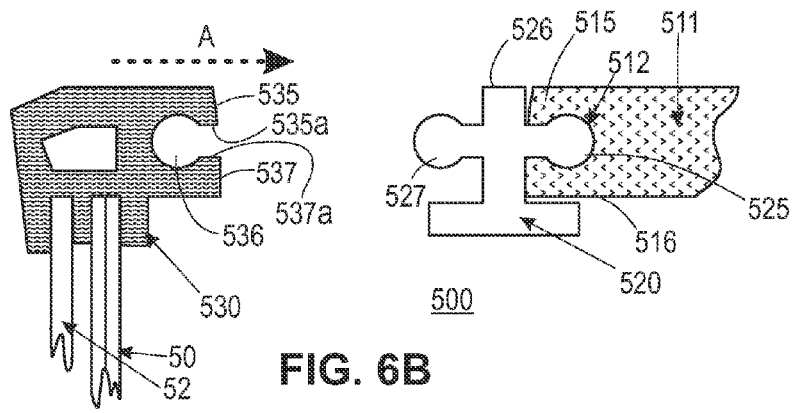
FIG. 6B is a partial top sectional view of the sixth embodiment of the screen frame and bezel clip system shown in FIG. 6A after partial assembly to the PTV cabinet.
Figure 6C:
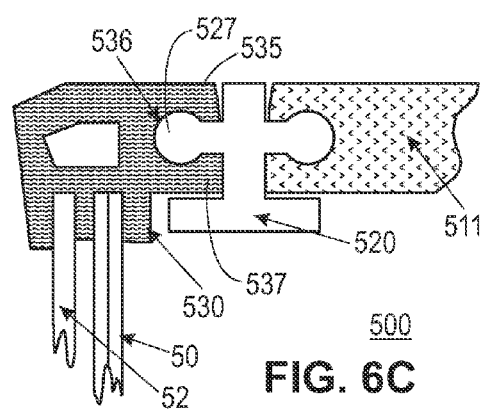
FIG. 6C is a partial top sectional view of the sixth embodiment of the screen frame and bezel clip system shown in FIGS. 6A and 6B after full assembly to the PTV cabinet.

The embodiments of a screen frame and bezel mount system, as depicted in FIGS. 6, 7 and 8, preferably include a stiffener coupled to the cabinet side wall and a screen frame and bezel member. Referring first to FIGS. 6A, 6B and 6C, the screen frame and bezel mount system 500 is shown to include a cabinet side wall 511 preferably formed from plastic. The side wall 511 includes a lobed socket or receptacle 512 with a narrowed opening 514 formed in a forward edge 513 of the side wall 511. The receptacle 512 is bounded by deformable legs 515 and 516 that are thickest toward the forward edge 513 of the side wall 511.

The mounting system 500 also includes a screen frame and bezel member 530 preferably formed from plastic and having a generally L-shaped body 532, the longer leg 534 of the L-shaped body 532 having a lobed socket or receptacle 536 with a narrowed opening 538 formed in a forward edge 539 of the longer leg 534 of the bezel member 530. The receptacle 536 is bounded by deformable legs 535 and 537 that are thickest toward the forward edge 539 of the longer leg 534. The bezel member 530 also includes a frame member 531 formed by the shorter leg of the L-shaped body 532. The frame member 531 includes first and second recesses 533a and 533b shaped and sized to receive and retain a side or edge portion of first and second screens 50 and 52 preferably comprising a lenticular and fresnel lens assembly and protective shield, respectively.

A stiffener 520 is preferably provided to couple the bezel member 530 to the side wall 511. The stiffener 520, preferably formed as an extrusion of a light weight metal such as aluminum and the like, has a generally inverted T-shaped body 522 with a generally horizontally disposed cross-member or base 524 and a leg 526 vertically extending orthogonally from the base 524. Extending orthogonally from the leg 526 is a pair of mirror image lobed prongs 525 and 527.

To install, the stiffener 520 is directed in a direction along arrow A to insert the first prong 525 into the receptacle 512 of the side wall 511. As the lobe of the prong 525 passes through the narrowed opening of the receptacle pressing against the inwardly extending ends 517 and 518 of the legs 515 and 516, the legs 515 and 516 deform outwardly until the lobe of the prong 525 passes beyond the ends 517 and 518. Once the lobe of the prong 525 moves beyond the ends 517 and 518, the legs 515 and 516 spring back to their pre-stressed orientation with the-inwardly extending ends 517 and 518 retaining the lobe of the prong 525 in the receptacle 512.

The bezel member 530 is similar installed by directing the bezel member 530 in a direction along arrow A to insert the second prong 527 into the receptacle 536 of the bezel member 530. As the lobe of the prong 527 passes through the narrowed opening of the receptacle pressing against the inwardly extending ends 535a and 537a of the legs 535 and 537, the legs 535 and 537 deform outwardly until the lobe of the prong 527 passes beyond the ends 535a and 537a. Once the lobe of the prong 527 moves beyond the ends 535a and 537a, the legs 535 and 537 spring back to their pre-stressed orientation with the inwardly extending ends 535a and 537a retaining the lobe of the prong 537 in the receptacle 536.

Figure 7A:
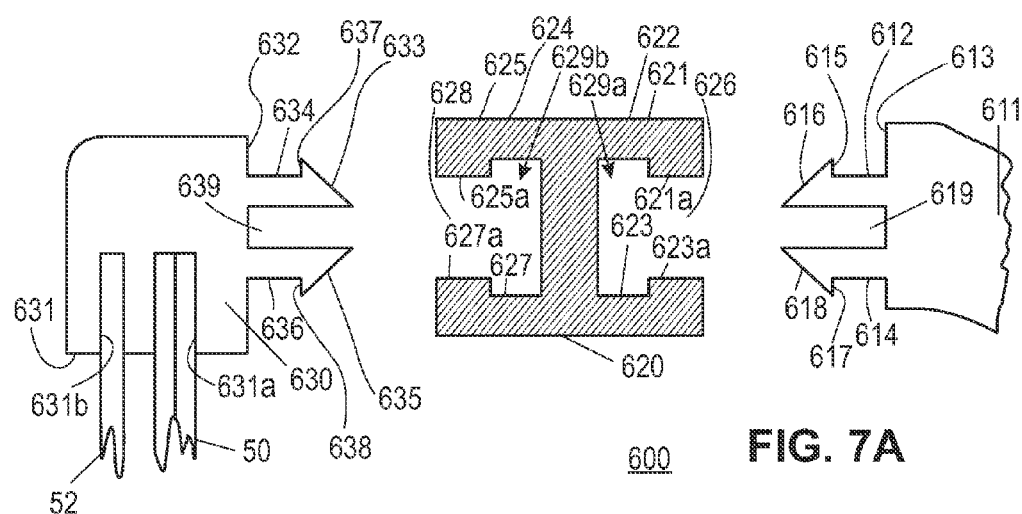
FIG. 7A is a partial top sectional view of a seventh embodiment of a screen frame and bezel clip system prior to assembly to a PTV cabinet.
Figure 7B:
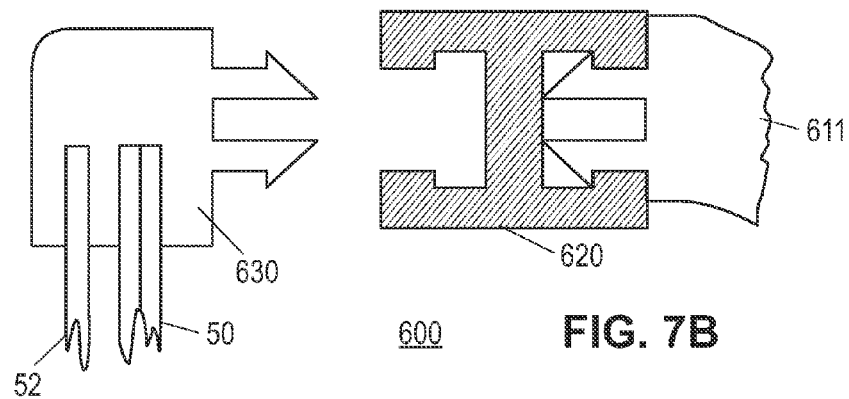
FIG. 7B is a partial top sectional view of the seventh embodiment of the screen frame and bezel clip system shown in FIG. 7A after partial assembly to the PTV cabinet.
Figure 7C:
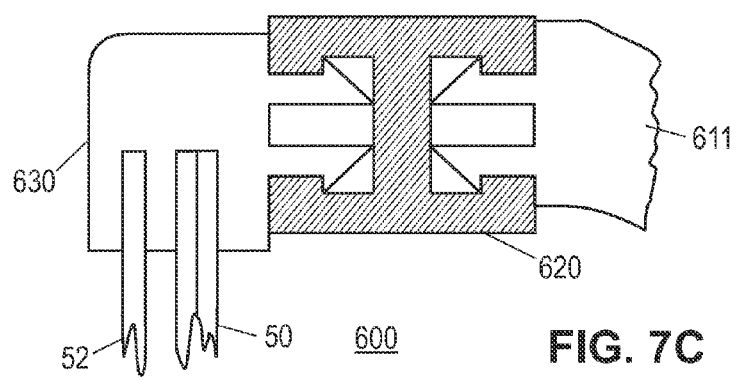
FIG. 7C is a partial top sectional view of the seventh embodiment of the screen frame and bezel clip system shown in FIGS. 7A and 7B after full assembly to the PTV cabinet.

Referring to FIGS. 7A, 7B and 7C, the screen frame and bezel mount system 600 is shown to include a cabinet side wall 611 preferably formed from plastic. Extending from a forward edge 613 of the side wall 611 is a pair of mirror image male prongs 612 and 614 in spaced relation forming a gap 619 there between. The elongate bodies of the prongs 612 and 614 include outwardly sloped or angled faces 616 and 618 at their free ends that extend beyond the width of the bodies to form a latch member 615 and 617 on each of the prongs 612 and 614.

The mount system 600 also includes a bezel member 630 preferably formed from plastic and having a pair of mirror image male prongs 634 and 636 extending from a first edge 632 of the bezel member 630 facing the side wall 611. The elongate bodies of the prongs 634 and 636 are in spaced relation forming a gap 639 there between and include outwardly sloped or angled faces 633 and 635 at their free ends that extend beyond the width of the bodies to form a latch member 637 and 638 on each of the prongs 634 and 636. The bezel member 630 also includes first and second recesses 631a and 631b formed in a second edge 631 that is generally orthogonally disposed relative to the first edge 632. The recesses 631a and 631b are shaped and sized to receive and retain a side or edge portion of first and second screens 50 and 52 preferably comprising a lenticular and fresnel lens assembly and protective shield, respectively A stiffener 620 is preferably provided to couple the bezel member 630 to the side wall 611. The stiffener 620, preferably formed as an extrusion of a light weight metal such as aluminum and the like, comprises first and second mirror image C-shaped female clasp members 622 and 624 integrally formed back to back. The clasps 622 and 624 include top and bottom legs 621, 623, 625 and 627 with inwardly extending ends 621a, 623a, 625a and 627a to form narrowed opening 626 and 628 open to receptacles 629a and 629b.

To install, the stiffener 620 is directed in a direction along arrow A to insert the prongs 612 and 614 extending from the side wall 611 into the receptacle 629a of the first clasp 622 of the stiffener 620. As the faces 616 and 618 of the prongs 612 and 614 pass through the narrowed opening 626 of the first clasp 622, the ends 621a and 623a of the legs 621 and 623 press against the faces 616 and 618 forcing the prongs 612 and 614 to deform inwardly toward one another reducing the gap 619 there between. Once the faces 616 and 618 of the prongs 612 and 614 move beyond the ends 621a and 623a of the legs 621 and 623 of the first clasp 622 into the receptacle 629a, the prongs 612 and 614 spring back to their pre-stressed orientation with the latch members 615 and 617 engaging the inwardly extending ends 621a and 623a to retain the prongs 612 and 614 in the receptacle 629a.

The bezel member 630 is similar installed by directing the bezel member 630 in a direction along arrow A to insert the prongs 634 and 636 extending from the bezel member 630 into the receptacle 629b of the second clasp 624 of the stiffener 620. As the faces 633 and 635 of the prongs 634 and 636 pass through the narrowed opening 628 of the second clasp 624, the ends 625a and 627a of the legs 625 and 627 press against the faces 633 and 635 forcing the prongs 634 and 636 to deform inwardly closing the gap 639 there between. Once the faces 633 and 635 of the prongs 634 and 636 move beyond the ends 625a and 627a of the legs 625 and 627 of the second clasp 622 into the receptacle 629b, the prongs 634 and 636 spring back to their pre-stressed orientation with the latch members 637 and 638 engaging the inwardly extending ends 625a and 627a to retain the prongs 634 and 636 in the receptacle 629b.

Figure 8A:
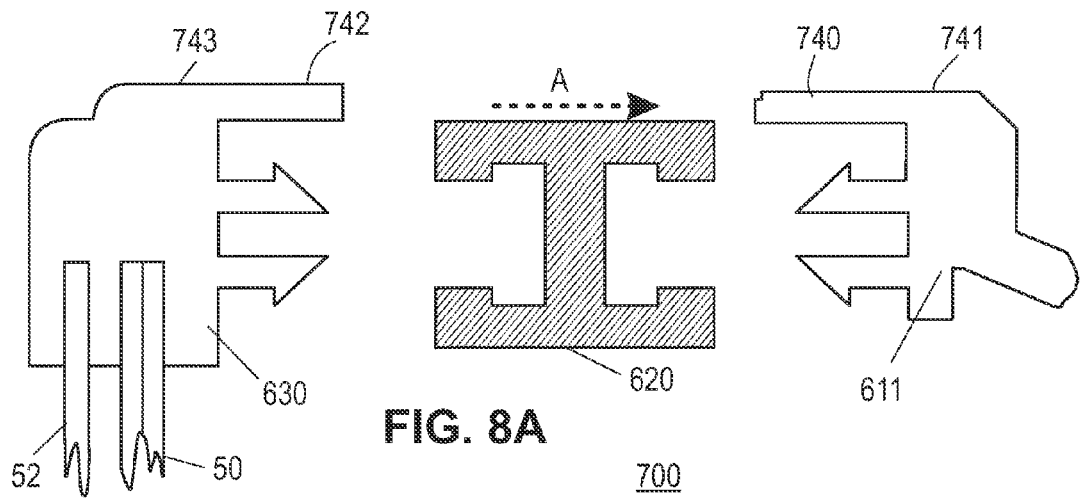
FIG. 8A is a partial top sectional view of a eighth embodiment of a screen frame and bezel clip system prior to assembly to a PTV cabinet.
Figure 8B:
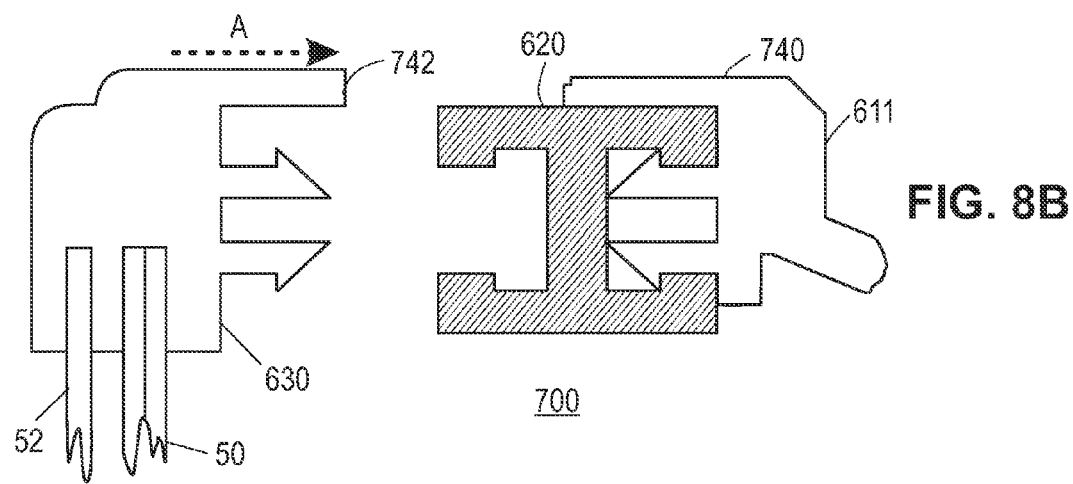
FIG. 8B is a partial top sectional view of the eighth embodiment of the screen frame and bezel clip system shown in FIG. 8A after partial assembly to the PTV cabinet.
Figure 8C:
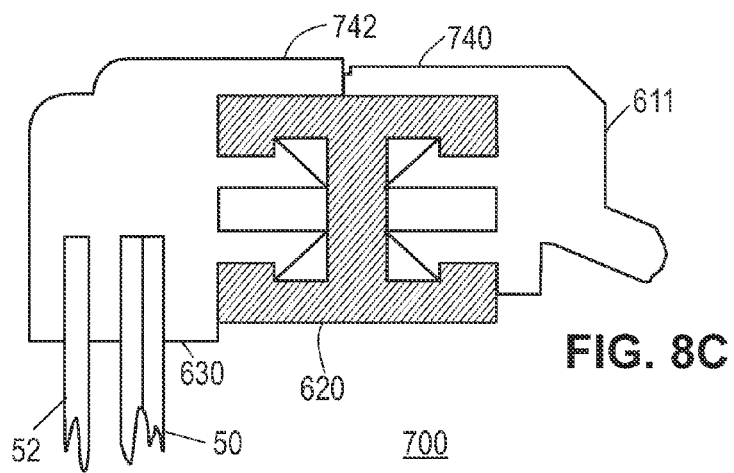
FIG. 8C is a partial top sectional view of the eighth embodiment of the screen frame and bezel clip system shown in FIGS. 8A and 8B after full assembly to the PTV cabinet.

The screen frame and bezel mount system 700 depicted in FIGS. 8A, 8B and 8C, is shown to include the substantially the same cabinet side wall 611, stiffener 620 and bezel member 630 as depicted in FIGS. 7A, 7B and 7C with the exception of the addition of first and second elongate extension arms 740 and 742 extending from the side wall 611 and bezel member 630 adjacent outer edges or surfaces 741 and 743 of the side wall 611 and bezel member 630. When the stiffener 620 and bezel member 630 are fully assembled and coupled to the side wall 611, the first and second extension arms 740 and 742 preferably hide the stiffener 620 from view from the outside of the cabinets side wall 611 and bezel member 630.

In the foregoing specification, the invention has been described with reference to specific embodiments thereof. It will, however, be evident that various modifications and changes may be made thereto without departing from the broader spirit and scope of the invention. Features and processes known to those of ordinary skill may be incorporated as desired. Additionally and obviously, features may be added or subtracted as desired. Furthermore, it should also be understood that the features or characteristics of any embodiment described or depicted herein can be combined, mixed or exchanged with any other embodiment. Accordingly, the invention is not to be restricted except in light of the attached claims and their equivalents.

What is claimed is:

1. A screen mount system comprising
    a bezel member extending along two or more sides of a screen opening in a display unit cabinet, the bezel member having a body with a latch member extending from the body and a frame member extending orthogonally from the body, wherein the latch member is a J-shaped hook having an elongate leg extending laterally away from the body and cabinet wall, a transition region extending generally orthogonally from the elongate leg and a return leg extending generally orthogonally from the transition member laterally toward the frame member and in spaced relation with a step formed in the frame member, wherein the return leg includes first and second sloped steps on the side of the return leg that faces the step of the frame member, and
    a retainer releasably couplable with the latch member to retain a screen abutted against the frame member.

2. The system of claim 1 wherein the screen is a protective shield.

3. The system of claim 1 wherein the retainer includes an L-shaped body wherein the long leg member of the L-shaped body forms a retaining arm that extends over an edge portion of a screen and the short leg member of the L-shaped body forms a latch arm that extends orthogonally to the retaining arm and across the edge of the screen.

4. The system of claim 3 wherein the latch arm includes a sloped step that is operably couplable with the first and second sloped steps of the return leg.

5. The system of claim 4 wherein the latch arm is couplable with the return leg to cosmetically cover a space between the return leg and the step and a void in the surface of the bezel resulting from the removal of the screen.

* * * * *